June 21, 1927. 1,632,860
G. A. TERRY
DENTAL HANDPIECE WRIST JOINT GUARD
Filed Aug. 5, 1925
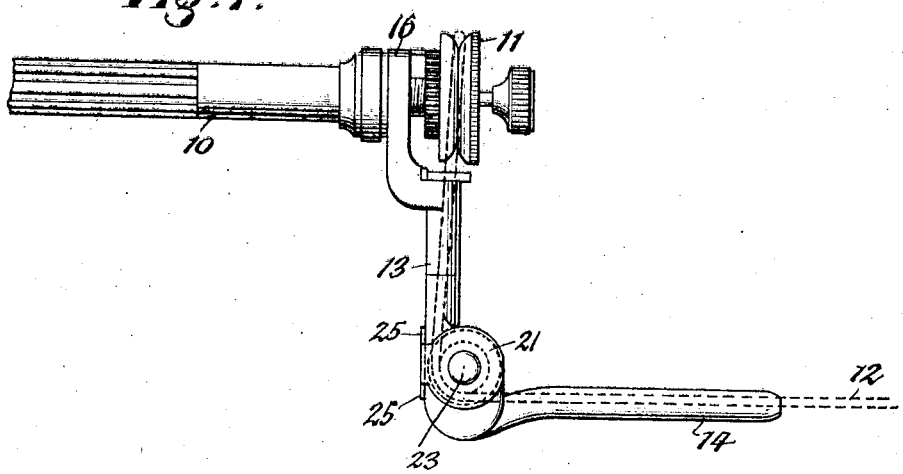
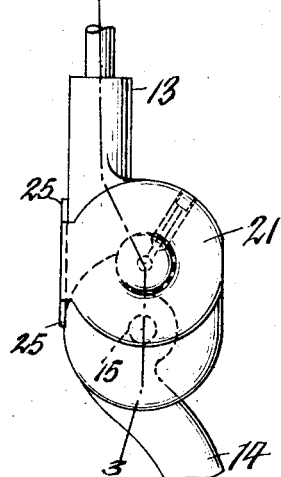
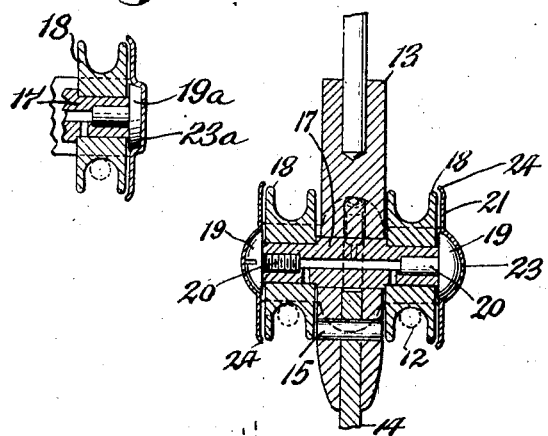
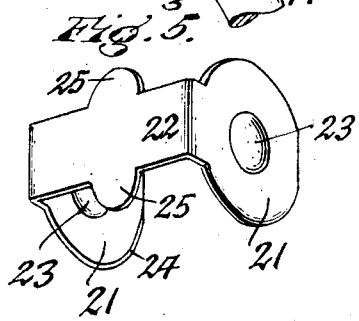
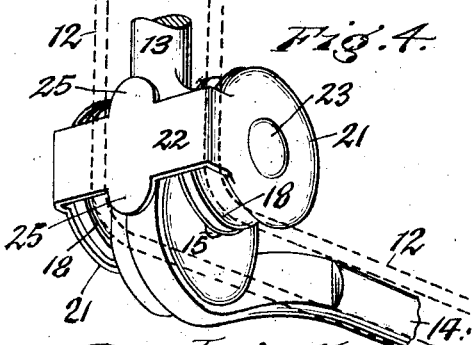
George A. Terry, Inventor Patented June 21, 1927.

1,632,860

UNITED STATES PATENT OFFICE.

GEORGE A. TERRY, OF BUFFALO, NEW YORK.

DENTAL HANDPIECE WRIST-JOINT GUARD.

Application filed August 5, 1925. Serial No. 48,295.

This invention relates to a guard for the wrist joint of dental hand pieces whereby the guide pulleys of the driving belt for rotating the hand piece is prevented from chafing or injuring the hand of the dentist or the body of the patient. The object of this invention is to provide a guard for this purpose which is simple and inexpensive, capable of being readily attached to and removed from the wrist joint of the hand piece and which effectively protects both the operator and the patient against injury and annoyance by the driving belt. To that end this guard consists of two guard disks adapted to engage with retaining heads at opposite ends of the pintle which pivotally supports the belt guide pulleys on the wrist joint, and a cross piece connecting the guard disks and extending across one side of the wrist joint.

In the accompanying drawings:—

Figure 1 is a side elevation of a dental hand piece having its wrist joint equipped with my improved guard.

Figure 2 is a similar view, on an enlarged scale, of the wrist joint provided with the guard.

Figure 3 is a vertical section of the same taken on line 3—3, Fig. 2.

Figure 4 is a perspective view of the wrist joint equipped with the guard.

Figure 5 is a similar view of the guard detached.

Figure 6 is a fragmentary vertical section similar to Fig. 3 and showing a modification of the means for retaining the guard in position.

Similar characters of reference indicate like parts in the several figures of the drawings.

The numeral 10 represents the rotary dental hand piece upon the front end of which a suitable tool is adapted to be mounted and the rear end of which is provided with a driven pulley 11 around which the turn of a driving belt 12 is adapted to pass. This hand piece is supported on the dental engine stand by an articulated bracket which includes a wrist joint which is coupled with the hand piece and arranged close to the wrist of the operator when the hand piece is in use. This wrist joint may consist of front and rear arms 13, 14 which are pivotally connected with each other by a transverse wrist pin 15 and said joint arm having a bearing 16 on which the hand piece is journaled while the rear arm is connected in any suitable manner with the stand of the dental engine.

On one side of the wrist pin the front wrist joint arm is provided with a pintle 17 extending transversely through this arm and projecting beyond the opposite sides thereof. Upon the reduced ends of the pintle are pivotally mounted guide pulleys 18 around which the stretches of the driving belt pass on the way to and from the driven pulley of the hand piece. These pulleys are retained on the ends of the pintle by retaining heads 19 overlapping the outer sides of the pulleys and each having a shank 20 which is secured in a recess in the adjacent end of the pintle. This shank may either have a smooth exterior and be held frictionally in the respective recess of the pintle, as shown at the right of Fig. 3, or the same may be threaded externally and engaged with a corresponding internal thread in the respective recess of the pintle, as shown at the left of Fig. 3. In the preferred construction the retaining heads are of spherical form, as shown in this figure.

My improved guard for the wrist joint is generally of U-form and consists of two disks or side plates 21 which are adapted to be arranged parallel adjacent to the outer sides of the guide pulleys and a cross piece or bar 22 arranged transversely of the wrist joint on the front or outer side thereof and connected at its opposite ends with the corresponding front edges of the guard disks. The inner sides of the guard disks are provided with spherical sockets 23 which receive the spherical heads on the pintle and the marginal part of each disk is of a larger diameter than the adjacent pulley and turned inwardly slightly without, however, extending across the plane of the outer side of this pulley, as shown in Fig. 3 at 24, thereby preventing this pulley from coming in contact with the hand of the operator or the body of the patient, and also preventing the driving belt from becoming caught between the guard disks and the guide pulleys.

The guard disks and cross bar are preferably constructed integrally from a single sheet of resilient metal, such as sheet steel, so as to necessitate springing the disks apart in order to permit of engaging their spherical sockets with the spherical retaining heads on the pintle after which the resilience of the metal operates to hold the guard frictionally on the pintle heads and in the proper position to protect the operator and patient against injury or annoyance.

The cross bar 22 is preferably comparatively narrow opposite the peripheral grooves of the guide pulleys which receive the driving belt and thereby permit the arms of the wrist joint to swing freely the maximum extent without liability of the cross bar interfering with the driving belt. In order however, to prevent a circumferential displacement of the guard the central part of the cross bar is engaged with the flat front side of the front wrist joint arm. For convenience in removing the guard from the wrist joint the cross bar is provided on the central part of its upper end and lower edges with finger pieces 25, 25 which permit of taking hold of the guard with the fingers and drawing the same laterally with sufficient force to disengage the sockets of the disks from the retaining heads and detaching the guard from the wrist joint when this is required for inspection, adjusting, lubricating or repairing.

In the modification shown in Fig. 6, the retaining heads 19ª which overlap the pulleys 18 and retain them on the reduced ends of the pintle 17 in the same manner as in the preferred construction, are of tapered or conical form and the two disks or side plates 21 of the guard which are adapted to be arranged adjacent the sides of the pulleys are each provided on their inner sides with conforming or conical sockets 23ª adapted to receive the respective head. By making the retaining heads and the sockets of the guard disks of conical form rather than spherical a more reliable engagement between these parts is obtained, and the guard is less likely to accidentally slip off. Only one retaining head is shown in Figure 6, but it is to be understood that the other head is also conical and that the wrist joint is in other respects similar to the preferred construction.

Owing to the guard being made of one piece the same is exceedingly simple in construction and it can be produced at low cost. It lies very close to the wrist joint when in use without interfering with any working parts and by reason of its frictional mounting on the wrist joint the same can be very easily and quickly attached thereto and removed therefrom when required.

I claim as my invention:—

1. A guard for a dental hand piece wrist joint having a pintle and belt guide pulleys mounted on said pintle, said guard comprising guard disks adapted to be arranged along the outer sides of said pulleys and to resiliently engage the opposite ends of the pintle, and a cross piece connecting the disks.

2. A guard for a dental hand piece wrist joint having a pintle, belt guide pulleys journaled on opposite ends of said pintle, and heads on the ends of the pintle overhanging the outer sides of said pulleys, said guard comprising guard disks arranged adjacent to the outer sides of said pulleys and provided on their inner sides with sockets adapted to receive said heads, and a cross piece connecting corresponding edges of said disks.

3. A guard for a dental hand piece wrist joint having a pintle, belt guide pulleys journaled on opposite ends of said pintle, and conical heads on the ends of the pintle overhanging the outer sides of said pulleys, said guard comprising guard disks arranged adjacent to the outer sides of said pulleys and provided on their inner sides with conical sockets adapted to receive said heads, and a cross piece connecting corresponding edges of said disks.

4. A guard for a dental hand piece wrist joint having a pintle, belt guide pulleys journaled on opposite ends of said pintle and heads on the ends of the pintle overhanging the outer sides of said pulleys, said guard comprising guard disks arranged adjacent to the outer sides of said pulleys and provided on their inner sides with sockets adapted to receive said heads, and a cross piece connecting corresponding edges of said disks, the end portions of said cross piece being comparatively narrow and the central part thereof being provided with a finger piece.

5. A guard for a dental hand piece wrist joint having a pintle, belt guide pulleys journaled on opposite ends of said pintle, and heads on the ends of the pintle overhanging the outer sides of said pulleys, said guard comprising guard disks arranged adjacent to the outer sides of said pulleys and provided on their inner sides with sockets adapted to receive said heads, and a cross piece connecting the corresponding edges of said disks, the central part of said cross piece being provided on its upper and lower edges with finger pieces, and said cross piece and disks being constructed integrally from a resilient sheet of metal.

In testimony whereof I affix my signature.

GEORGE A. TERRY.